US012649110B2

(12) United States Patent (10) Patent No.: US 12,649,110 B2

Ono et al. (45) Date of Patent: Jun. 9, 2026

(54) NON-TRANSITORY COMPUTER-READABLE STORAGE MEDIUM HAVING STORED THEREIN GAME PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Makoto Ono, Kyoto (JP); Jun Takamura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 520 days.

(21) Appl. No.: 17/894,466

(22) Filed: Aug. 24, 2022

(65) Prior Publication Data

US 2023/0086484 A1    Mar. 23, 2023

(30) Foreign Application Priority Data

Sep. 22, 2021    (JP) ................................. 2021-154061

(51) Int. Cl.
A63F 13/56        (2014.01)
A63F 13/533       (2014.01)
(52) U.S. Cl.
CPC ............ A63F 13/56 (2014.09); A63F 13/533 (2014.09)
(58) Field of Classification Search
CPC .... A63F 13/56; A63F 13/533; A63F 13/5372; A63F 13/54
USPC ......................................................... 463/31
See application file for complete search history.

(56) References Cited

U.S. PATENT DOCUMENTS

| | | | |
|---|---|---|---|
| 6,166,718 A | 12/2000 | Takeda | |
| 11,638,869 B2 * | 5/2023 | Gotoh | A63F 13/48 |
| | | | 463/36 |
| 2003/0216177 A1 | 11/2003 | Aonuma et al. | |
| 2009/0305787 A1 * | 12/2009 | Ikejiri | A63F 13/843 |
| | | | 463/43 |
| 2010/0173709 A1 * | 7/2010 | Horovitz | G06V 30/304 |
| | | | 463/35 |
| 2011/0031692 A1 * | 2/2011 | Siegel | A63F 9/0415 |
| | | | 463/16 |

(Continued)

FOREIGN PATENT DOCUMENTS

| | | |
|---|---|---|
| JP | H10-69367 | 3/1998 |
| JP | 2003-325973 | 11/2003 |

(Continued)

OTHER PUBLICATIONS

"Animal Crossing: New Horizons Direct", Nintendo Co., Ltd., searched on Sep. 8, 2021, <URL:https://www.nintendo.co.jp/switch/acbaa/movie/index.html> and its English corresponding <URL:https://www.nintendo.com/nintendo-direct/02-20-2020/>, 16 pages.

*Primary Examiner* — Michael C Grant
(74) *Attorney, Agent, or Firm* — Nixon & Vanderhye, PC

(57)            ABSTRACT

A game program according to an exemplary embodiment causes a computer to, based on an operation input provided by the player, move a cursor object indicating a position on a terrain object having a difference in height in a three-dimensional virtual space, and when the cursor object moves, output different cursor sounds in accordance with a height of the terrain object indicated by the cursor object.

25 Claims, 8 Drawing Sheets

(56)          References Cited

U.S. PATENT DOCUMENTS

| | | | |
|---|---|---|---|
| 2012/0135789 A1* | 5/2012 | Feidner ................. | G09B 15/02 |
| | | | 463/7 |
| 2014/0162528 A1* | 6/2014 | Derby, Jr. .............. | A63H 19/24 |
| | | | 446/410 |
| 2018/0199022 A1 | 7/2018 | Ueda et al. | |
| 2019/0366212 A1 | 12/2019 | Kusakihara | |
| 2023/0086484 A1* | 3/2023 | Ono ........................ | A63F 13/54 |
| | | | 463/31 |

FOREIGN PATENT DOCUMENTS

| | | |
|---|---|---|
| JP | 2008-188307 | 8/2008 |
| JP | 2018-110659 | 7/2018 |
| JP | 2019-209115 | 12/2019 |

* cited by examiner

F I G .  1
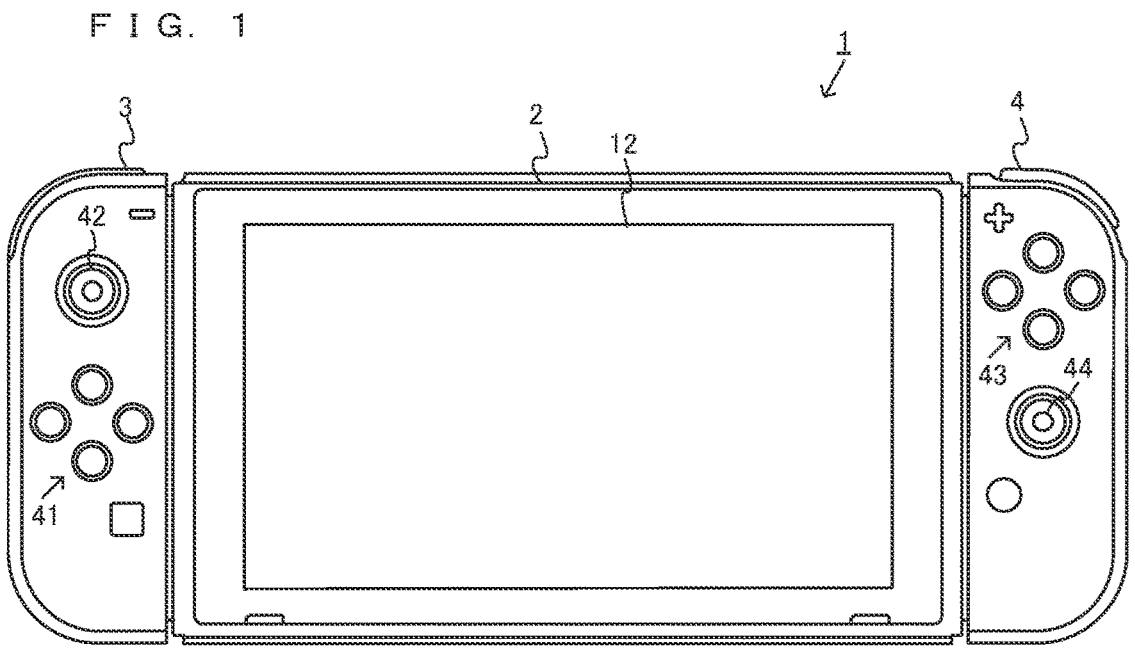
F I G .  2
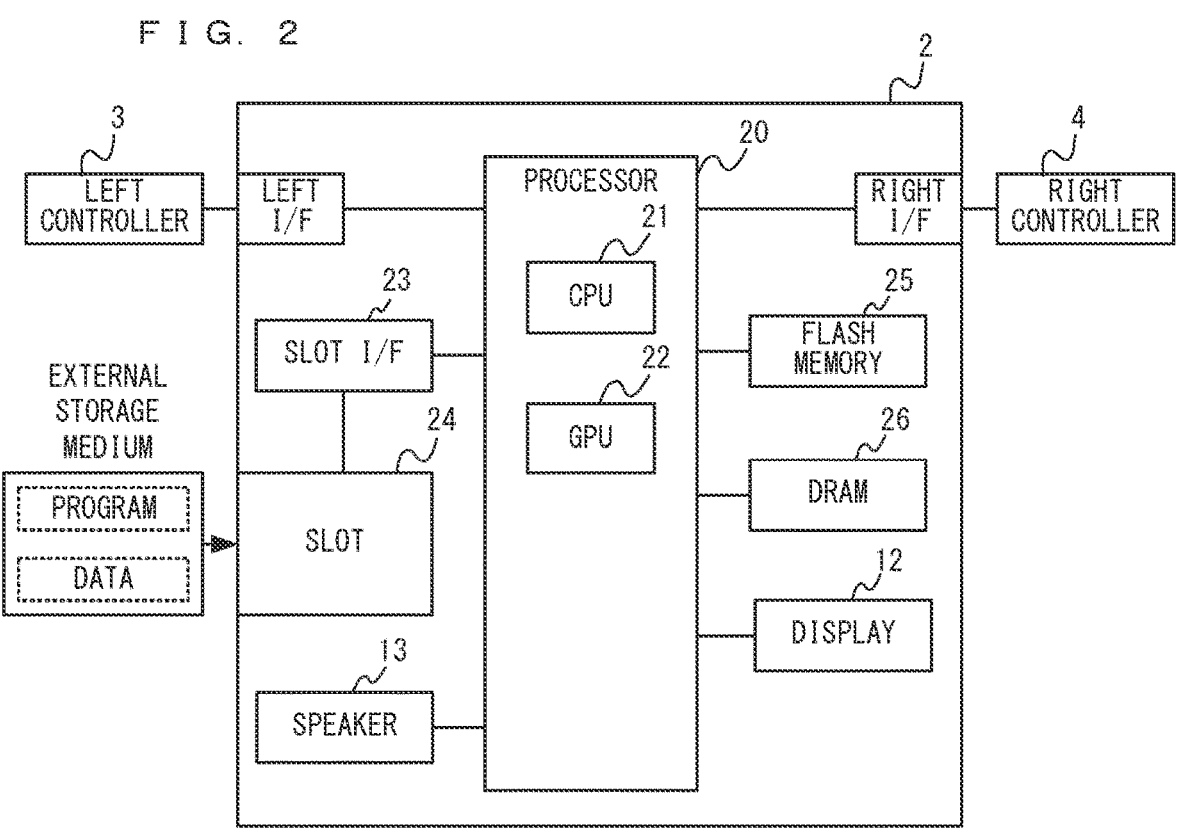

F I G. 6
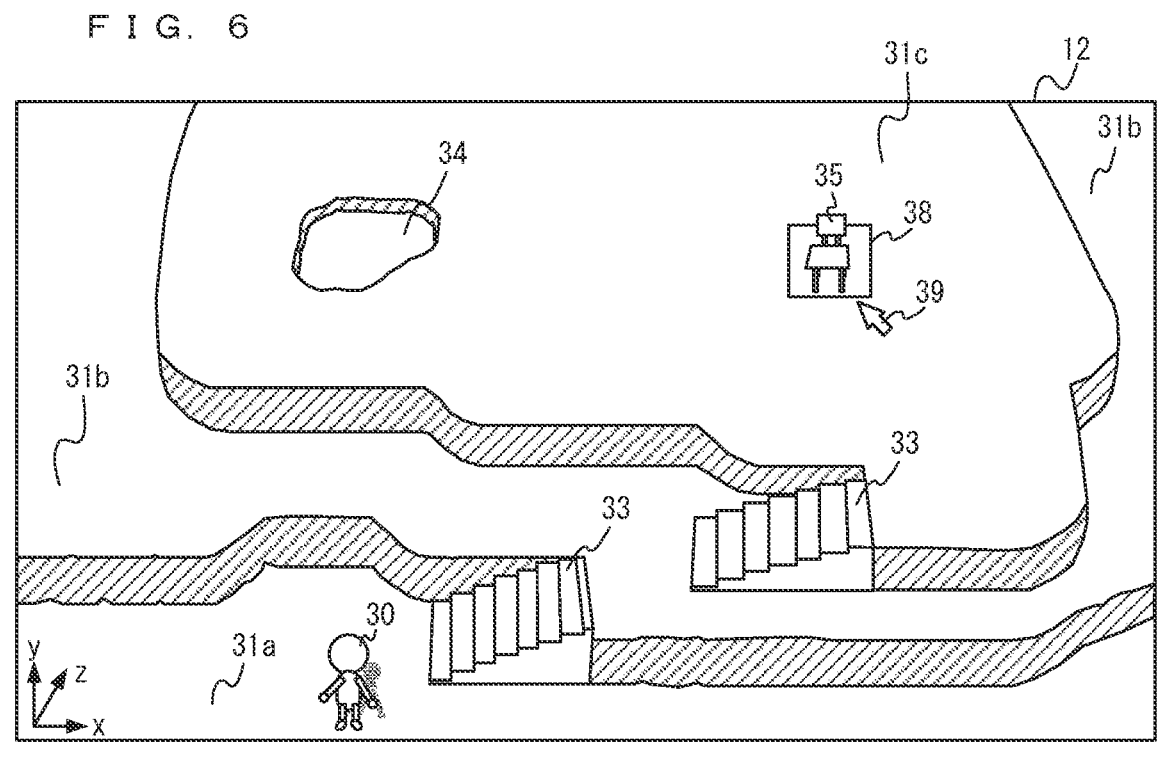
F I G. 7
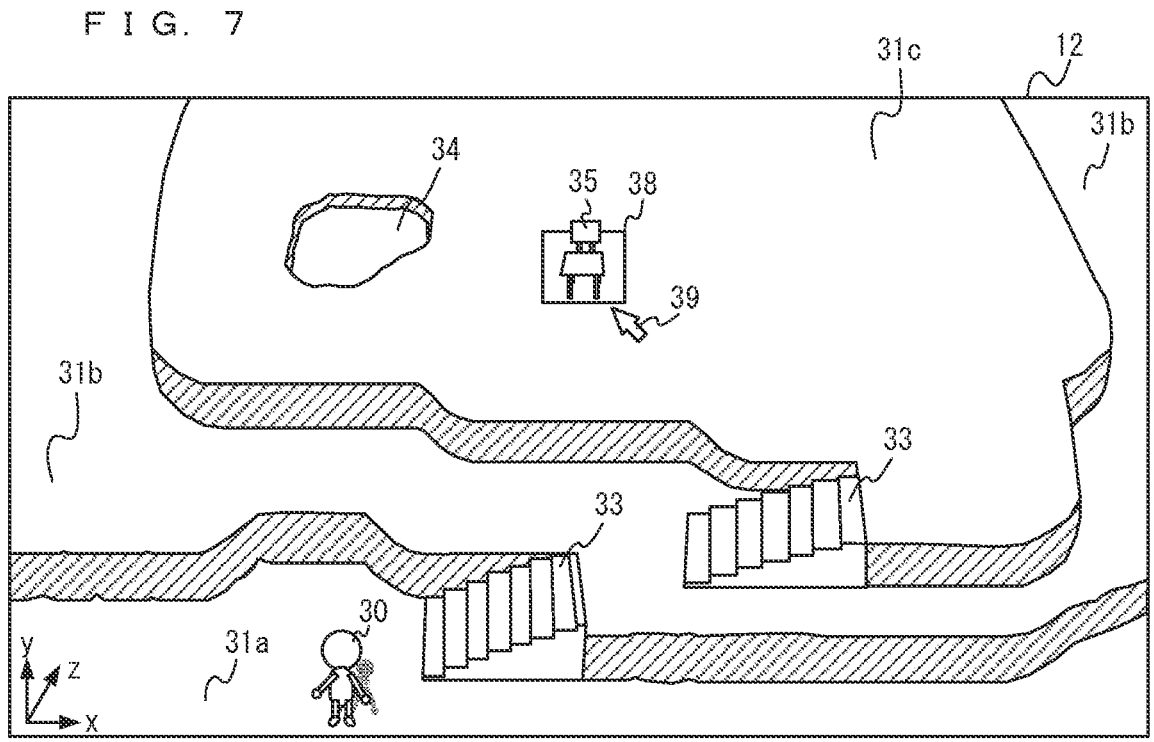

F I G. 8
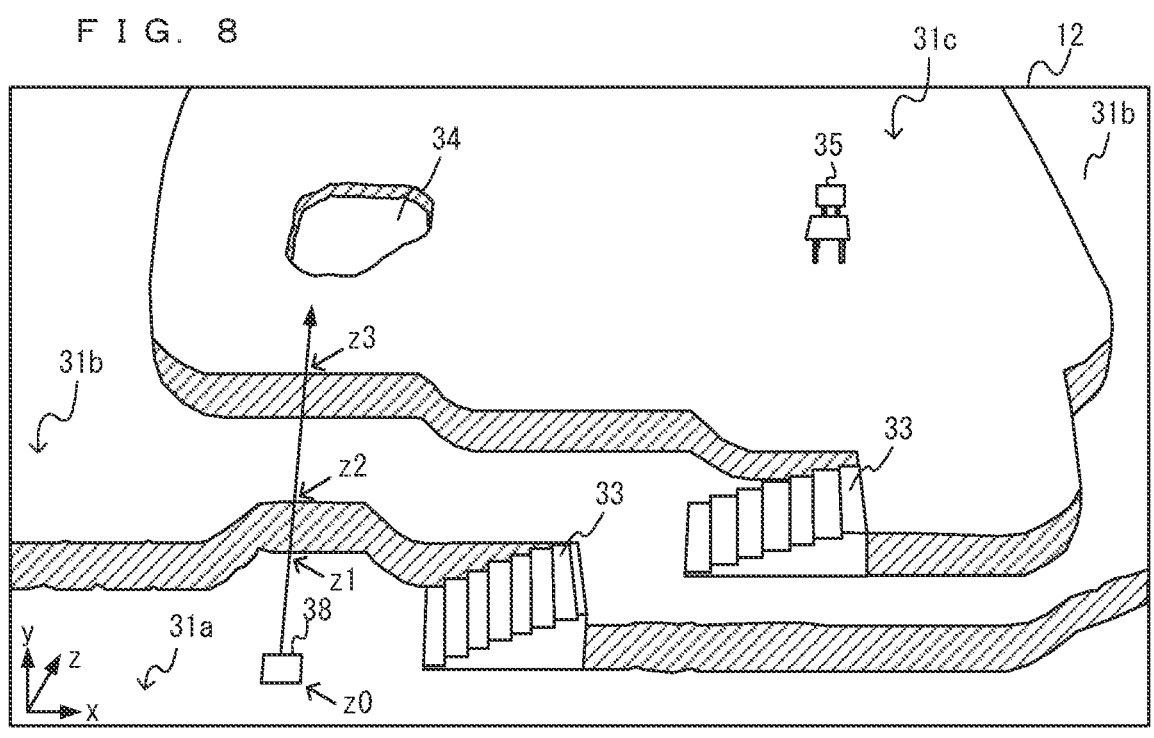
F I G. 9
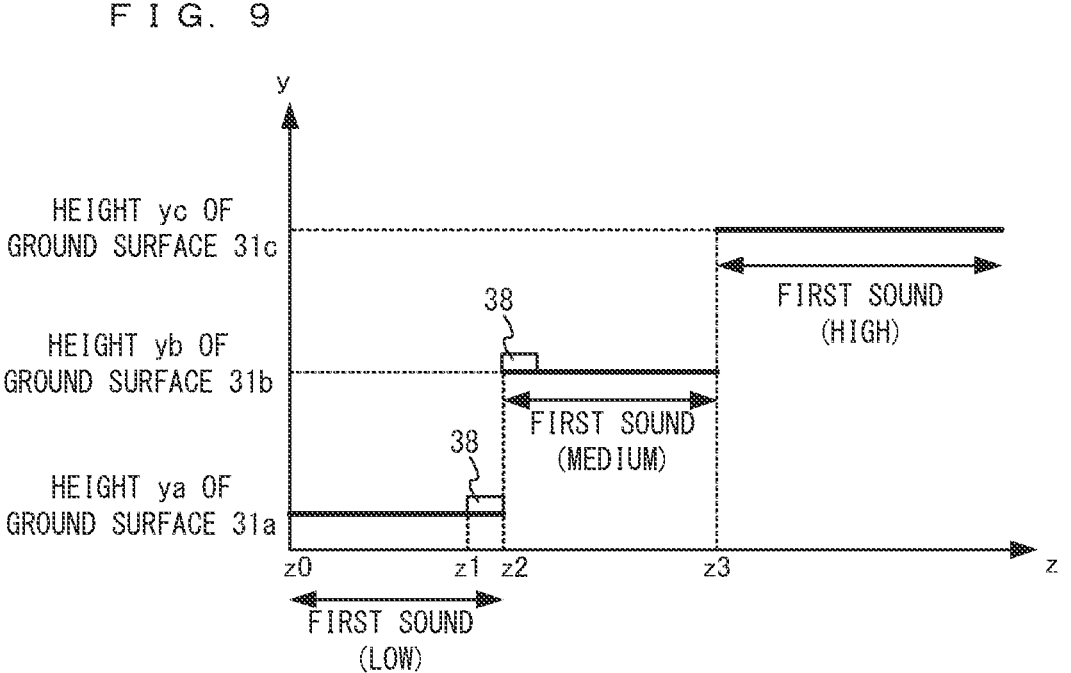

F I G.  1 2

| GAME PROGRAM |
| TERRAIN DATA |
| CURSOR DATA |
| OBJECT DATA |
| CHARACTER DATA |
| CURSOR SOUND DATA |

F I G .  1 3
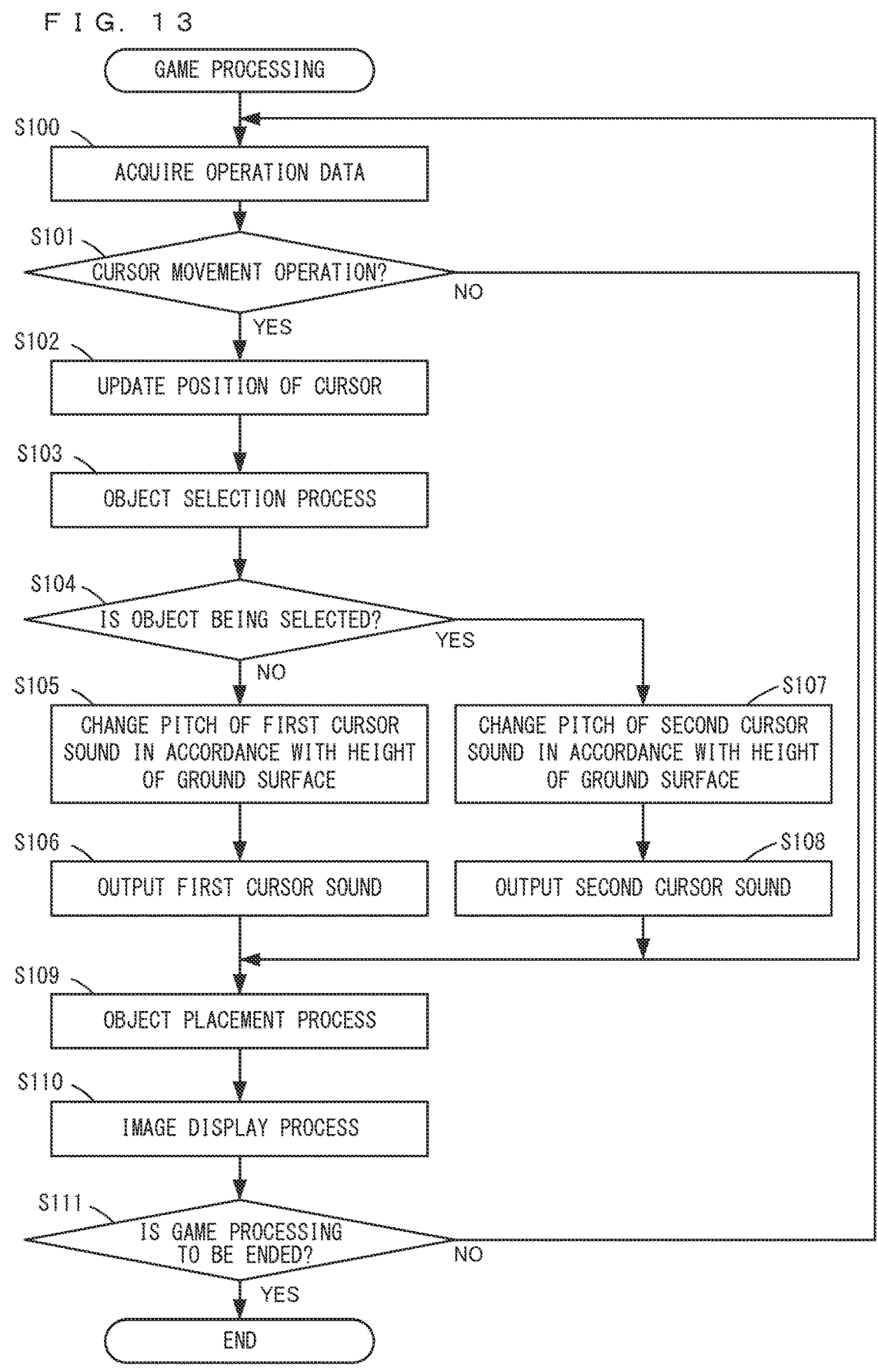

NON-TRANSITORY COMPUTER-READABLE STORAGE MEDIUM HAVING STORED THEREIN GAME PROGRAM, INFORMATION PROCESSING APPARATUS, INFORMATION PROCESSING SYSTEM, AND INFORMATION PROCESSING METHOD

CROSS REFERENCE TO RELATED APPLICATION

This application claims priority to Japanese Patent Application No. 2021-154061 filed on Sep. 22, 2021, the entire contents of which are incorporated herein by reference.

FIELD

An exemplary embodiment relates to a non-transitory computer-readable storage medium having stored therein a game program, an information processing apparatus, an information processing system, and an information processing method.

BACKGROUND AND SUMMARY

As a related art, for example, there is a game apparatus that emits a sound when moving a cursor in a virtual space.

In the related art, however, there is room for improvement in making it easy for a user to grasp a position indicated by the cursor on a terrain having a difference in height.

Therefore, it is an object of an exemplary embodiment to provide a non-transitory computer-readable storage medium having stored therein a game program, an information processing apparatus, an information processing system, and an information processing method that are capable of making it easy for a user to recognize a position indicated by a cursor on a terrain having a difference in height.

To achieve the above object, the exemplary embodiment employs the following configurations.

A non-transitory computer-readable storage medium having stored therein a game program according to the exemplary embodiment causes a computer of an information processing apparatus to: based on an operation input provided by the player, move a cursor object indicating a position on a terrain object having a difference in height in a three-dimensional virtual space; and when the cursor object moves, output different cursor sounds in accordance with a height of the terrain object indicated by the cursor object.

Based on the above, when a cursor object moves, different cursor sounds are output in accordance with the height of a terrain object indicated by the cursor object. Consequently, it is possible to cause a player to easily recognize which position on a terrain object having a difference in height the cursor object indicates.

Further, the game program may cause the computer to output the cursor sounds different in at least any one of a pitch, a loudness, and a timbre of a sound in accordance with the height of the terrain object.

Based on the above, it is possible to output different cursor sounds in accordance with the height of the terrain object.

Further, the game program may cause the computer to, based on the operation input, place a virtual object at a position on the terrain object indicated by the cursor object.

Based on the above, it is possible to place a virtual object on the terrain object using the cursor object.

Further, the game program may cause the computer to select a virtual object present on the terrain object indicated by the cursor object.

Based on the above, it is possible to select a virtual object on the terrain object using the cursor object.

Further, the game program may cause the computer to, based on the operation input, move the cursor object together with a virtual object that is being selected using the cursor object.

Based on the above, it is possible to, based on an operation input, move the cursor object and a virtual object that is being selected.

Further, the game program may cause the computer to, if the virtual object is not being selected using the cursor object, output different first cursor sounds in accordance with the height of the terrain object when moving the cursor object. The game program may cause the computer to, if the virtual object is being selected using the cursor object, output different second cursor sounds in accordance with the height of the terrain object when moving the cursor object and the virtual object.

Based on the above, if the virtual object is not being selected, it is possible to output a first cursor sound in accordance with the movement of the cursor object, and if the virtual object is being selected, it is possible to output a second cursor sound in accordance with the movement of the cursor object.

Further, the game program may cause the computer to change the height of the terrain object based on the operation input.

Based on the above, the player can change the height of the terrain object. Even in a case where the player changes the height of the terrain object, it is possible to output different cursor sounds in accordance with the changed height of the terrain object.

Further, the cursor object may be moved in section units on the terrain object or along the terrain object based on the operation input.

Based on the above, it is possible to move the cursor object in section units.

Another exemplary embodiment may be an information processing apparatus that executes the above game program, or may be an information processing system. Yet another exemplary embodiment may be an information processing method executed by a processor.

According to the exemplary embodiment, when a cursor object moves, it is possible to output different cursor sounds in accordance with the height of a terrain object indicated by the cursor object.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 1 is a diagram showing an example non-limiting game system 1 according to an exemplary embodiment;

FIG. 2 is a block diagram showing an example non-limiting internal configuration of the game system 1;

FIG. 6 is a diagram showing an example non-limiting state where a chair object 35 placed on a terrain object 31 is selected using the cursor object 38;

FIG. 7 is a diagram showing an example non-limiting state where the chair object 35 is moved using the cursor object 38;

FIG. 8 is a diagram showing an example non-limiting state where the cursor object 38 is moved in a z-axis direction;

FIG. 9 is a diagram showing an example non-limiting relationship between the height of the terrain object 31 and a first cursor sound to be output in a case where the cursor object 38 is moved in the z-axis direction;

FIG. 12 is a diagram showing example non-limiting data stored in a memory (e.g., a DRAM 26) of a main body apparatus 2; and FIG. 13 is a flow chart showing example non-limiting game processing performed by a processor 20 of the main body apparatus 2.

Figure 3:
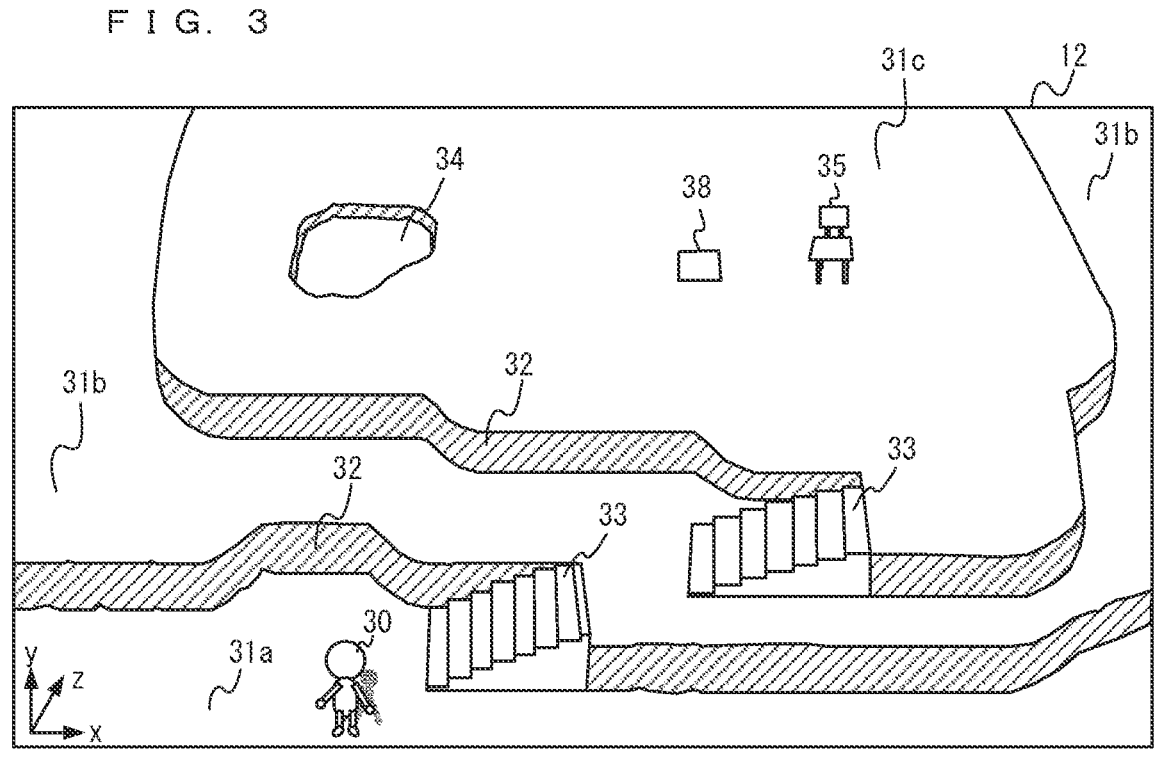
FIG. 3 is a diagram showing an example non-limiting game image displayed on a display 12 in a case where a game according to the exemplary embodiment is performed.

DETAILED DESCRIPTION OF NON-LIMITING EXAMPLE EMBODIMENTS (System Configuration)

Figure 1:
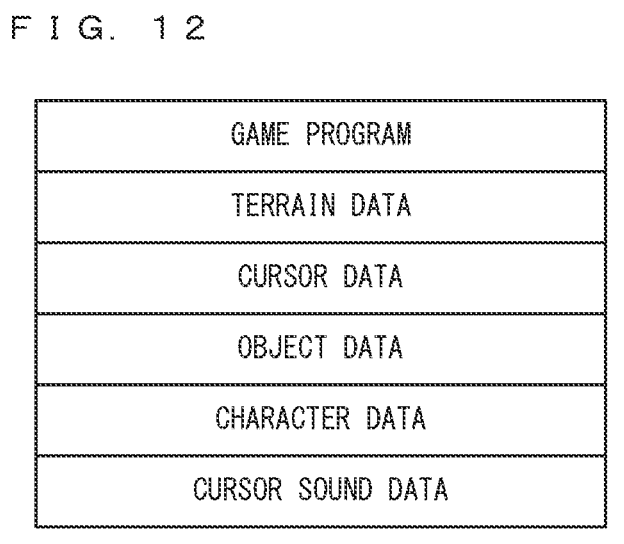

With reference to the drawings, a game system 1 (an example of an information processing system) according to an exemplary embodiment is described below. FIG. 1 is a diagram showing an example of the game system 1 according to the exemplary embodiment. As shown in FIG. 1, the game system 1 includes a main body apparatus 2 as a game apparatus (an example of an information processing apparatus), a left controller 3, and a right controller 4. The main body apparatus 2 also includes a display 12 and a speaker 13. In the display 12, a touch panel is provided. The left controller 3 and the right controller 4 are detachably attached to the main body apparatus 2.

The left controller 3 is a controller operated with the left hand of a user, and the right controller 4 is a controller operated with the right hand of the user. The left controller 3 includes a plurality of operation buttons 41 and an analog stick 42 as a direction input section. The right controller 4 includes a plurality of operation buttons 43 and an analog stick 44 as a direction input section.

FIG. 2 is a block diagram showing an example of the internal configuration of the game system 1. As shown in FIG. 2, the main body apparatus 2 includes a processor 20, a slot 24, a flash memory 25, and a DRAM (Dynamic Random Access Memory) 26. The processor 20 includes a CPU (Central Processing Unit) 21 and a GPU (Graphics Processing Unit) 22. The CPU 21 can execute a game program. The CPU 21 processes operation data from the controllers 3 and 4 and performs game processing based on the operation data. The GPU 22 is a processor for performing image processing. The CPU 21 and the GPU 22 may be mounted on different chips, or may be mounted as an SoC (System-on-a-chip) on a single chip.

To the processor 20, a slot interface (I/F) 23, the flash memory 25, the DRAM 26, and the display 12 are connected. To the processor 20, the left controller 3 is also connected via a left interface (I/F) and the right controller 4 is also connected via a right interface (I/F). Into the slot 24, an external storage medium such as a non-volatile memory or an optical disc is detachably inserted. The external storage medium stores a game program and data (sound data and terrain data described below). The program and the data may be stored in advance in the flash memory 25, or may be downloaded from another apparatus (e.g., a server) via a network (e.g., the Internet) and stored in the flash memory 25.

The game program and the data stored in the external storage medium (or the flash memory 25) are loaded into the DRAM 26 when a game is started. The CPU 21 executes the game program, thereby performing game processing described below.

The CPU 21 sends a command to display a game image relating to the game processing on the display 12 to the GPU 22. In accordance with the command, the GPU 22 generates a game image. The generated game image is output to and displayed on the display 12. An external display device different from the display 12 may be connected to the main body apparatus 2, and the game image may be displayed on the external display device.

The CPU 21 also outputs a sound relating to the game processing from the speaker 13, using a codec circuit (not shown). The sound relating to the game processing may be output from an external speaker different from the speaker 13 in the main body apparatus 2.

Overview of Game Processing According to Exemplary Embodiment

Next, an overview of game processing according to the exemplary embodiment is described. FIG. 3 is a diagram showing an example of a game image displayed on the display 12 in a case where a game according to the exemplary embodiment is performed. If a game program according to the exemplary embodiment is executed, the main body apparatus 2 defines a three-dimensional virtual space and sets an xyz orthogonal coordinate system in the virtual space. The x-axis is an axis in a horizontal direction in the virtual space, the z-axis is an axis in a depth direction in the virtual space, and the y-axis is an axis in a height direction in the virtual space.

As shown in FIG. 3, in the virtual space, a terrain object 31 is set. The terrain object 31 is an object representing a ground surface in the virtual space. The terrain object 31 includes a plurality of terrain objects 31*a* to 31*c* different in height from each other. The terrain object 31*a* is a flat surface (a ground surface) having a height ya and parallel to the xz plane. The terrain object 31*b* is a flat surface (a ground surface) having a height yb (>ya) and parallel to the xz plane. The terrain object 31*c* is a flat surface (a ground surface) having a height yc (>yb) and parallel to the xz plane.

Between the terrain object 31*a* and the terrain object 31*b*, a vertical surface 32 (a wall surface) parallel to the y-axis is present. The terrain object 31*a* and the terrain object 31*b* are connected together by the vertical surface 32. Between the terrain object 31*b* and the terrain object 31*c*, a vertical surface 32 parallel to the y-axis is present. The terrain object 31*b* and the terrain object 31*c* are connected together by the vertical surface 32.

On the terrain object 31, various virtual objects are placed. As shown in FIG. 3, for example, a player character 30 is placed on the terrain object 31. The player character 30 is configured to move on the terrain object 31 based on an operation input using the left or right controller (an example of an operation device). For example, in a mode where the player character 30 is moved, if an operation input is provided to the analog stick 42 of the left controller 3, the player character 30 is moved in a direction relating to the operation direction of the analog stick 42.

In the terrain object 31c, a pond 34 representing an area to which the player character 30 cannot move is formed.

On the terrain object 31, a stair object 33 is also placed. The stair object 33 is an object fixed onto the terrain object 31, and is not moved in accordance with an operation input provided by a player. The stair object 33 is an object for enabling the player character 30 to move between portions of the terrain object 31 having a difference in height. In addition to these, a tree object and a house object (not shown) fixed onto the terrain object 31 may be placed on the terrain object 31.

On the terrain object 31, a chair object 35 is also placed. The chair object 35 is a virtual object capable of moving on the terrain object 31 in accordance with an operation input provided by the player. In addition to the chair object 35, various virtual objects capable of moving on the terrain object 31 are placed on the terrain object 31. The virtual objects capable of moving may be placed in advance in the virtual space, or may be placed in accordance with an operation input provided by the player.

As shown in FIG. 3, on the display 12, a cursor object 38 is displayed. The cursor object 38 is an object for indicating a position on the terrain object 31. The cursor object 38 is a flat surface having a predetermined shape and is a square, for example.

The cursor object 38 is placed on the terrain object 31 and can move on the terrain object 31 in accordance with an operation input using the left or right controller. The cursor object 38 may move on the terrain object 31 in accordance with an operation input provided to the touch panel provided in the display 12.

The cursor object 38 may be placed at a position at a predetermined height from the terrain object 31 and moved along the terrain object 31 (parallel to the ground surface) in accordance with an operation input provided by the player. In this case, for example, if the cursor object 38 indicates a position (xa, ya, za) on the terrain object 31a, the cursor object 38 is placed at a position (xa, ya+$\alpha$, za). For example, if the cursor object 38 indicates a position (xb, yb, zb) on the terrain object 31b, the cursor object 38 is placed at a position (xb, yb+$\alpha$, zb).

The game image shown in FIG. 3 is generated based on a virtual camera placed in the virtual space. In FIG. 3, the angle of the virtual camera to the ground is 70 degrees to 80 degrees, for example. In the exemplary embodiment, the image capturing direction of the virtual camera can be changed based on an operation input provided by the player. For example, the angle of the virtual camera to the ground may be set to 80 to 90 degrees in accordance with an operation input provided by the player. In this case, a game image looking down on the virtual space from directly above is displayed, and the vertical surfaces 32 (the wall surfaces) in FIG. 3 almost cease to be displayed.

Figure 4:
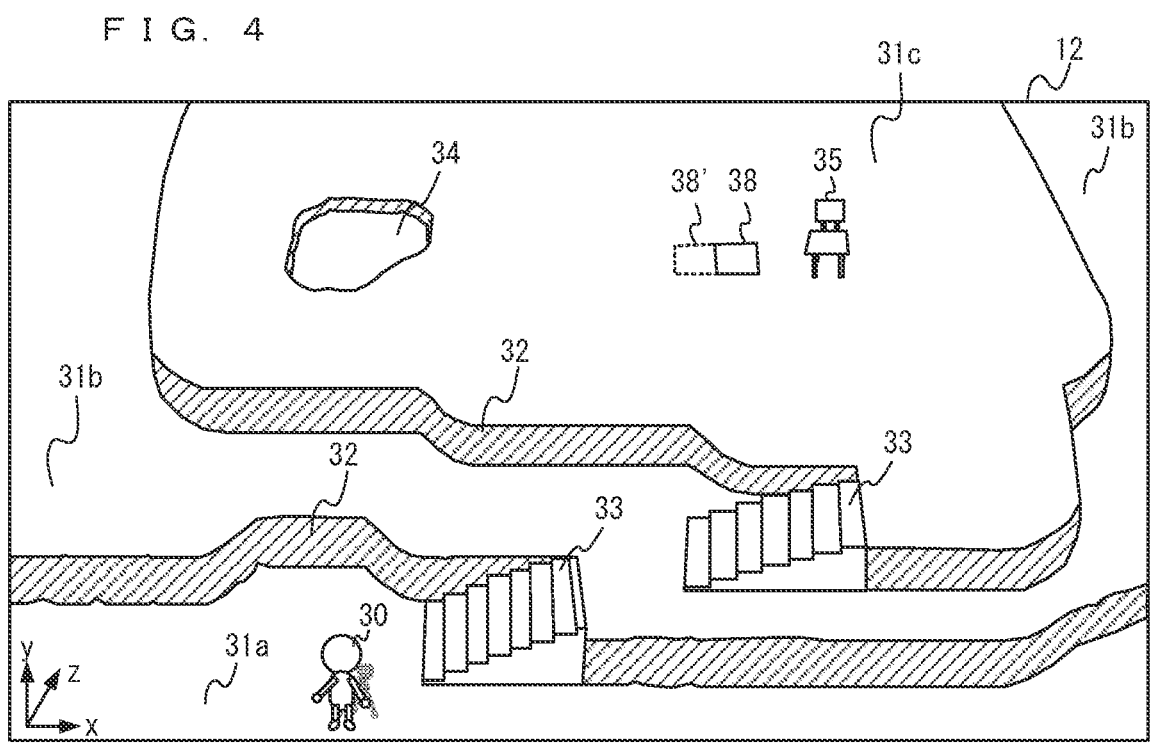
FIG. 4 is a diagram showing an example non-limiting state where a cursor object 38 is moved based on an operation input provided by a player.

FIG. 4 is a diagram showing an example of the state where the cursor object 38 is moved based on an operation input provided by the player. In FIG. 4, a sign 38' represents the cursor object before the movement. A sign 38 represents the cursor object after moving to the right by a single section.

As shown in FIG. 4, the cursor object 38 moves in section units on the terrain object 31. The xz plane in the virtual space is divided by square sections, for example. The cursor object 38 moves in these section units on the terrain object 31. For example, in a mode where a virtual object is placed using the cursor object 38, if an operation input in the right direction is provided using the analog stick 42 of the left controller 3, the main body apparatus 2 detects the operation input in the right direction. Based on the operation input, the main body apparatus 2 moves the cursor object 38 from the current section to a section adjacent to the current section on the right side. Consequently, the cursor object moves from 38' to 38 shown in FIG. 4.

The player can move the cursor object 38 to a desired position and place a virtual object at a position on the terrain object 31 indicated by the cursor object 38. The player can place a new virtual object at the position of the cursor object 38.

Figure 5:
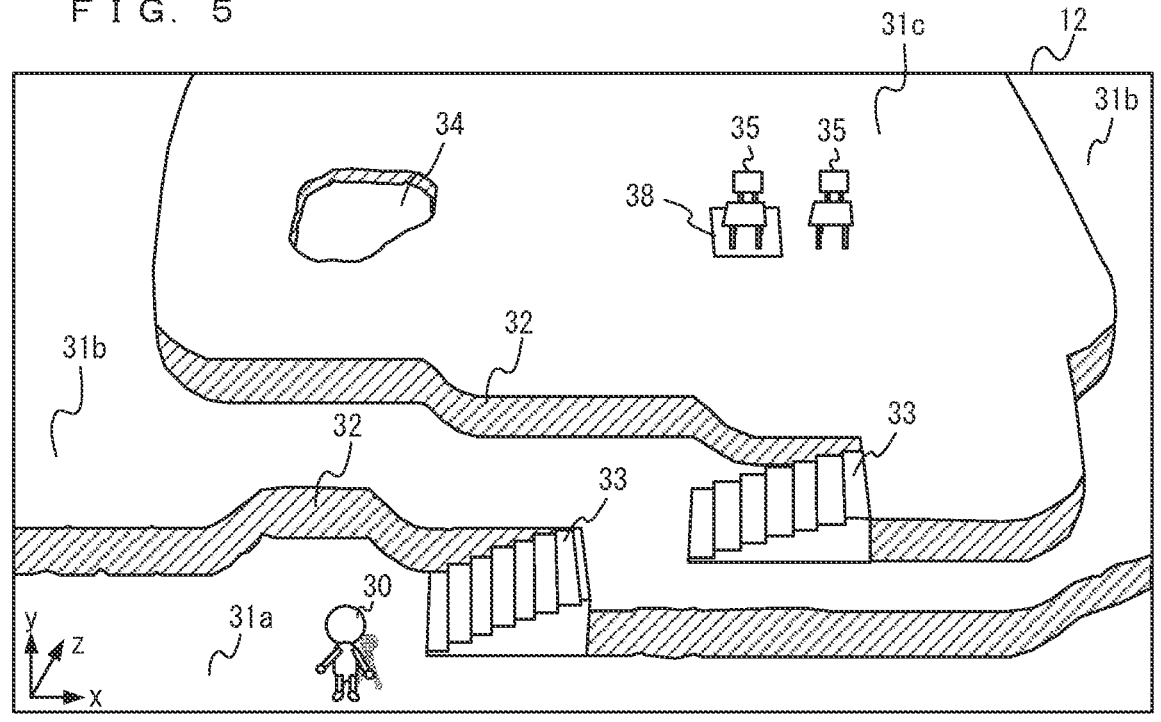
FIG. 5 is a diagram showing an example non-limiting state where a virtual object at a position indicated by the cursor object 38 shown in FIG. 4.

FIG. 5 is a diagram showing an example of the state where a virtual object is placed at the position indicated by the cursor object 38 shown in FIG. 4.

For example, after the cursor object 38 is moved as shown in FIG. 4, and if a predetermined button of the left or right controller is pressed, a menu (not shown) is displayed, and a chair object (an example of a virtual object) is selected from the menu. Consequently, as shown in FIG. 5, the selected chair object 35 is newly placed at the position on the terrain object 31 indicated by the cursor object 38. Before the cursor object 38 is moved, a virtual object to be placed may be selected. In this case, for example, the player selects a virtual object to be placed from a menu, then moves the cursor object 38, and provides an operation input for placement, thereby placing the selected virtual object at the position of the cursor object 38.

Although the cursor object 38 can be moved to the area of the pond 34, a virtual object is not placed in the area of the pond 34.

The player can also move the cursor object 38, select a virtual object capable of moving that is placed on the terrain object 31, and move the selected virtual object, thereby placing the selected virtual object at another position on the terrain object 31.

FIG. 6 is a diagram showing an example of the state where the chair object 35 placed on the terrain object 31 is selected using the cursor object 38. FIG. 7 is a diagram showing an example of the state where the chair object 35 is moved using the cursor object 38.

As shown in FIG. 6, if the cursor object 38 reaches the position of the chair object 35 (an example of a virtual object) placed on the terrain object 31, a pointer 39 appears. The pointer 39 is an object indicating that the cursor object 38 indicates a virtual object. If the cursor object 38 indicates a virtual object, the display form of the cursor object 38 changes. For example, when the cursor object 38 does not indicate a virtual object, a relatively small cursor object 38 is displayed as shown in FIG. 3. If the cursor object 38 indicates a virtual object, a relatively large cursor object 38 is displayed as shown in FIG. 6. When the cursor object 38 indicates a virtual object, the color of the cursor object 38 may change, or the cursor object 38 may blink.

When the cursor object 38 indicates the chair object 35, and if an operation input for selection is provided using the left or right controller, the chair object 35 is selected. If the cursor object 38 reaches the position of a virtual object, the virtual object may be selected without providing an operation input for selection.

As shown in FIG. 7, if an operation input for movement is provided using the left or right controller in the state where the chair object 35 is selected, the chair object 35 is moved together with the cursor object 38. Then, if an operation input for placement is provided using the left or right controller, the chair object 35 is placed at a position indicated by the cursor object 38.

Here, in the game according to the exemplary embodiment, when the cursor object 38 moves, the cursor sound is output. Specifically, different cursor sounds are output in accordance with the height of the terrain object 31 indicated by the cursor object 38.

FIG. 8 is a diagram showing the state where the cursor object 38 is moved in the z-axis direction. FIG. 9 is a diagram showing an example of the relationship between the height of the terrain object 31 and a first cursor sound to be output in a case where the cursor object 38 is moved in the z-axis direction.

A case is assumed where the cursor object 38 is moved from the position in FIG. 8 in a direction indicated by an arrow based on an operation input provided by the player. In a case where a virtual object is not being selected using the cursor object 38, and when the cursor object 38 moves, a first cursor sound is output. The main body apparatus 2 (specifically, a memory such as the external storage medium or the DRAM 26) stores first sound data relating to the first cursor sound. Based on the first sound data, the first cursor sound is output.

As shown in FIG. 9, if the cursor object 38 is located on the terrain object 31*a*, i.e., if the height of a terrain object indicated by the cursor object 38 is ya, a first cursor sound (low) is output. The first cursor sound (low) is a sound obtained by changing the pitch of the normal first cursor sound generated based on the first sound data and is a sound having a lower pitch than the normal first cursor sound. Here, the normal first cursor sound is referred to as a "first cursor sound (medium)".

For example, while the cursor object 38 moves from a position z0 to a position z1 in the z-axis direction, the height of the position indicated by the cursor object 38 is ya. Every time the cursor object 38 moves by a single section, the first cursor sound (low) is output. If the cursor object 38 is further moved from the position z1 in the z-axis direction by a single section, the position in the z-axis direction of the cursor object 38 is z2. At this time, the cursor object 38 moves onto the terrain object 31*b*, and the height of the position indicated by the cursor object 38 is yb. In this case, the first cursor sound (medium) is output.

In a case where the cursor object 38 is further moved from the position z2 in the z-axis direction, the cursor object 38 moves on the terrain object 31*b*. Every time the cursor object 38 moves by a single section on the terrain object 31*b*, the first cursor sound (medium) is output.

In a case where the cursor object 38 reaches an edge portion of the terrain object 31*b* and is further moved by a single section in the z-axis direction, the position in the z-axis direction of the cursor object 38 is z3. At this time, the cursor object 38 moves onto the terrain object 31*c*, and the height of the position indicated by the cursor object 38 is yc. In this case, a first cursor sound (high) is output. The first cursor sound (high) is a sound obtained by changing the pitch of the first cursor sound generated based on the first sound data and is a sound having a higher pitch than the first cursor sound (medium). Every time the cursor object 38 moves by a single section on the terrain object 31*c*, the first cursor sound (high) is output.

Next, a case is described where the cursor object 38 is moved when a virtual object is being selected using the cursor object 38.

Figure 10:
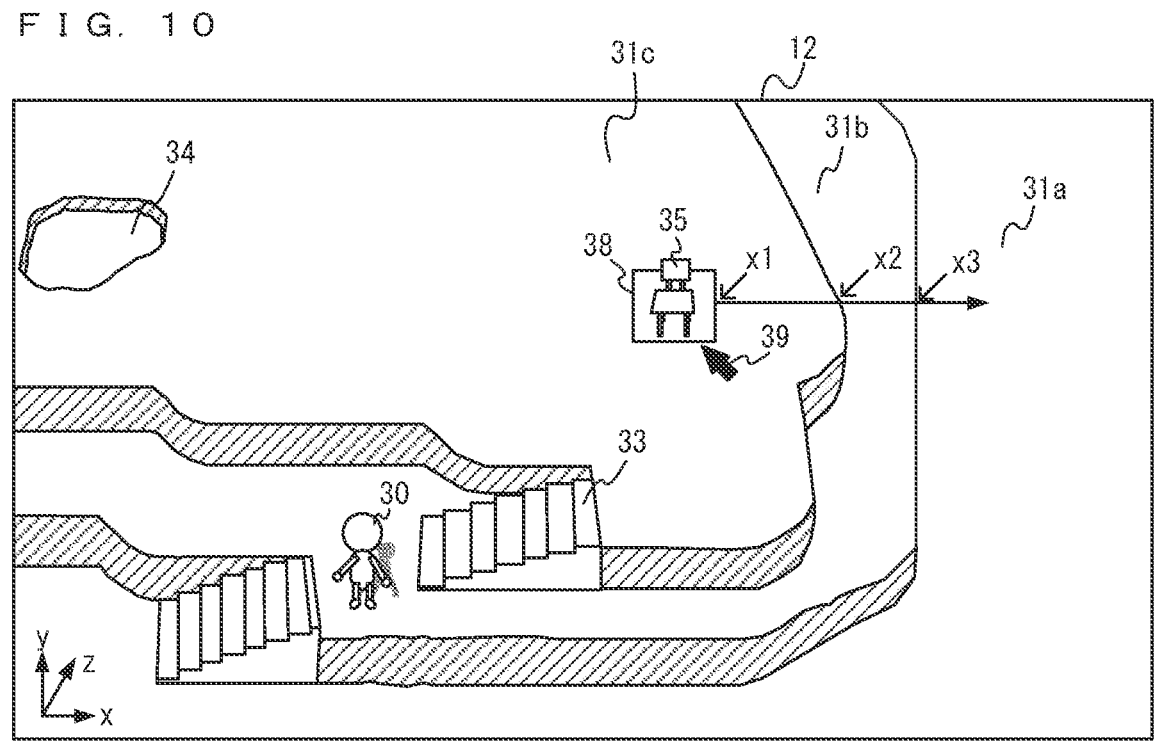
FIG. 10 is a diagram showing an example non-limiting state where the cursor object 38 is moved in an x-axis direction in a case where a virtual object is being selected using the cursor object 38.
Figure 11:
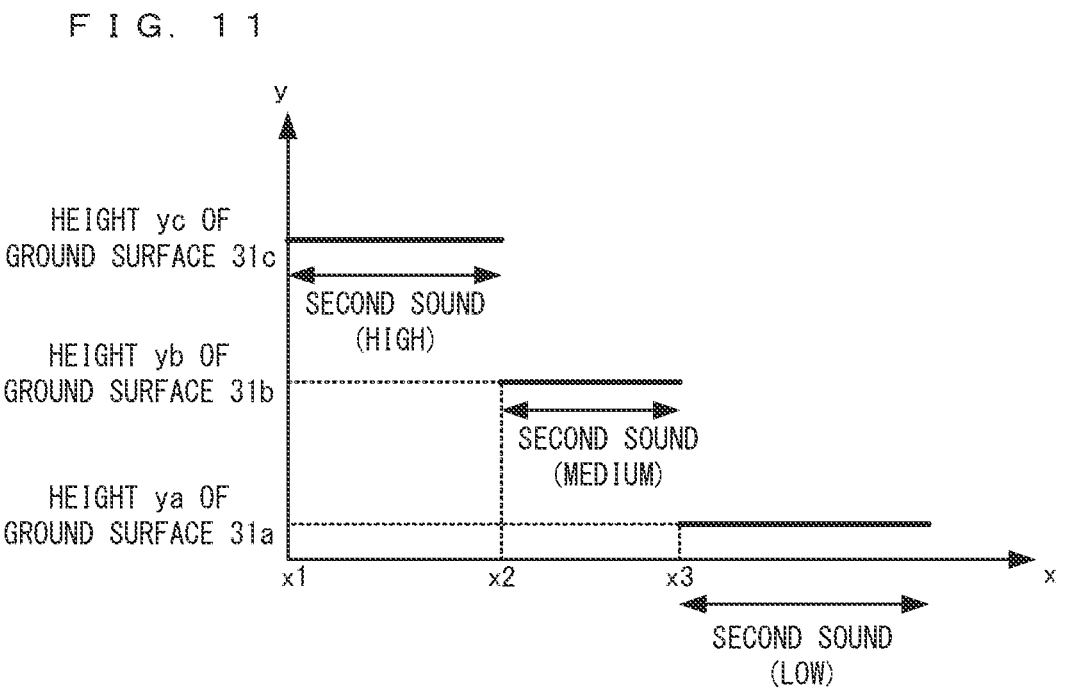
FIG. 11 is a diagram showing an example non-limiting relationship between the height of the terrain object 31 and a second cursor sound to be output in a case where the cursor object 38 and the virtual object move in the x-axis direction.

FIG. 10 is a diagram showing the state where the cursor object 38 is moved in the x-axis direction in a case where a virtual object is being selected using the cursor object 38. FIG. 11 is a diagram showing an example of the relationship between the height of the terrain object 31 and a second cursor sound to be output in a case where the cursor object 38 and a virtual object move in the x-axis direction.

In a case where a virtual object is being selected using the cursor object 38, and when the cursor object 38 moves, a second cursor sound is output. The main body apparatus 2 (specifically, a memory such as the external storage medium or the DRAM 26) stores second sound data relating to the second cursor sound. Based on the second sound data, the second cursor sound is output.

Specifically, when the chair object 35 is being selected using the cursor object 38, and for example, if the right direction of the analog stick 42 is input, the cursor object 38 and the chair object 35 move from a position x1 in FIG. 10 in a direction indicated by an arrow. In a case where the cursor object 38 and the chair object 35 move on the terrain object 31*c*, a second cursor sound (high) is output. The second cursor sound (high) is a sound obtained by changing the pitch of the normal second cursor sound generated based on the second sound data and is a sound having a higher pitch than the normal second cursor sound. The normal second cursor sound is referred to as a "second cursor sound (medium)". Every time the cursor object 38 and the chair object 35 move by a single section on the terrain object 31*c*, the second cursor sound (high) is output.

In a case where the cursor object 38 and the chair object 35 reach a position x2, the cursor object 38 and the chair object 35 move onto the terrain object 31*b*, and the height of the position indicated by the cursor object 38 is yb. In this case, the second cursor sound (medium) is output. Every time the cursor object 38 and the chair object 35 move by a single section on the terrain object 31*b*, the second cursor sound (medium) is output.

The right direction is further input, the cursor object 38 and the chair object 35 reach a position x3. At this time, the cursor object 38 and the chair object 35 move onto the terrain object 31*a*, and the height of the position indicated by the cursor object 38 is ya. In this case, a second cursor sound (low) is output. The second cursor sound (low) is a sound obtained by changing the pitch of the second cursor sound (medium) generated based on the second sound data and is a sound having a lower pitch than the second cursor sound (medium). Every time the cursor object 38 and the chair object 35 move by a single section on the terrain object 31*a*, the second cursor sound (low) is output.

As described above, when the cursor object 38 moves, different cursor sounds are output in accordance with the height of the terrain object 31 indicated by the cursor object 38. Consequently, for example, in a case where the cursor object 38 moves across portions of a terrain object having a difference in height, the cursor sound changes. Thus, the player can easily recognize that the cursor object 38 moves to a portion of the terrain object different in height. Based on the cursor sound, the player can also recognize which portion of the terrain object 31 the cursor object 38 indicates.

For example, a vertical surface 32 (a wall surface) is present between the terrain object 31*c* and the terrain object 31*b*. The vertical surface 32, however, may not be displayed on a screen depending on the position or the image capturing direction of the virtual camera. For example, in a case where the angle between the image capturing direction of the virtual camera and the ground is close to 90 degrees, the vertical surface 32 is hardly displayed. As shown in FIG. 10, in a case where the cursor object 38 is moved from the position x1 in the right direction, and if the cursor object 38 comes close to the position x2, the player may have difficulty understanding whether the cursor object 38 is present on the terrain object 31c or is present on the terrain object 31b. For example, in a case where texture images of the same color or the same type of color are mapped to the terrain object 31c and the terrain object 31b, it may be difficult for the player to recognize the boundary between the terrain object 31c and the terrain object 31b. Thus, in a case where the cursor object 38 is present near the boundary between the terrain object 31c and the terrain object 31b, the player has difficulty distinguishing on which portion of the terrain object 31 the cursor object 38 is located.

In the exemplary embodiment, however, different cursor sounds are output in accordance with the height of the terrain object 31 indicated by the cursor object 38. Consequently, it is possible to cause the player to easily recognize which position on a terrain object having a difference in height a cursor object indicates. For example, in a case where the cursor object 38 indicates a portion near the boundary between the terrain objects 31b and 31c, based on the cursor sound output in accordance with the movement of the cursor object 38, the player can easily recognize whether the cursor object 38 indicates the terrain object 31c or indicates the terrain object 31b. Consequently, the player can place a virtual object at a desired position using the cursor object 38.

The output timing of the cursor sound may be any timing. For example, the cursor sound may be output at the timing when the movement of the cursor object 38 relating to an operation input is completed. The cursor sound may be output during the movement of the cursor object 38 relating to an operation input. The cursor sound may be output at the timing when the cursor object 38 starts moving in accordance with an operation input.

(Details of Game Processing)

Next, an example of game processing performed by the main body apparatus 2 is specifically described. First, a description is given of data stored in the main body apparatus 2.

FIG. 12 is a diagram showing an example of data stored in a memory (e.g., the DRAM 26) of the main body apparatus 2. As shown in FIG. 12, the main body apparatus 2 stores a game program, terrain data, cursor data, object data, character data, and cursor sound data. In addition to these pieces of data, various pieces of data such as operation data relating to an operation of the player, data regarding a character other than the player character, and other pieces of data used in the game are stored.

The game program is a program for executing the game according to the exemplary embodiment. The game program is stored in, for example, the external storage medium. When the game is started, the game program is loaded from the external storage medium into the DRAM 26.

The terrain data is data regarding a terrain in the virtual space and is data indicating the position, the direction, the shape, and the like of each of the terrain objects (31a to 31c). For example, each terrain object is formed of a plurality of polygons. The terrain data includes the coordinate values of the vertices of each polygon. The terrain object 31 having a difference in height is formed based on the terrain data. In the exemplary embodiment, while game processing described below is performed, the terrain data is not changed in accordance with an operation input provided by the player.

The cursor data is data regarding the cursor object 38 and includes cursor position data indicating the position of the cursor object 38. The cursor position data includes the coordinate values of the xyz axes. The cursor data includes data indicating the shape of the cursor object 38 and data indicating whether or not the cursor object 38 is selecting a virtual object.

The object data is data regarding a virtual object (e.g., the chair object 35) that can be moved in the virtual space by the player. The object data includes data indicating the type of the virtual object, the position and the direction in the virtual space of the virtual object, and the like.

The character data is data regarding the player character 30 and includes data indicating the position, the direction, the shape, and the like of the player character 30.

The cursor sound data is sound data for outputting the cursor sound, and for example, is stored in advance in the external storage medium. The cursor sound data includes first sound data relating to a first cursor sound and second sound data relating to a second cursor sound. The first cursor sound is output when a virtual object is not being selected using the cursor object 38. The second cursor sound is output when a virtual object is being selected using the cursor object 38.

(Description of Flow Chart)

Next, a description is given of the details of the game processing performed by the main body apparatus 2. FIG. 13 is a flow chart showing an example of game processing performed by the processor 20 of the main body apparatus 2.

Processing shown in FIG. 13 is performed by the processor 20 (the CPU 21 or the GPU 22) of the main body apparatus 2 executing the game program. The processor 20 repeatedly executes the processes of steps S100 to S111 every predetermined frame time (e.g., 1/60 seconds). FIG. 13 shows only processes regarding the above movement of the cursor object 38 and omits other processes in the game (e.g., the process of moving the player character 30 based on operation data, the process of causing the player character 30 to perform a predetermined action, and the like).

As shown in FIG. 13, in step S100, the processor 20 acquires operation data relating to an operation input provided by the player from the left controller 3 and the right controller 4. Next, the processor 20 executes the process of step 101.

In step S101, based on the operation data, the processor 20 determines whether or not a cursor movement operation is performed. For example, if an operation on the analog stick 42 of the left controller 3 is performed, the processor 20 determines that the cursor movement operation is performed. If it is determined that the cursor movement operation is performed (step S101: YES), next, the processor 20 executes the process of step 102. If, on the other hand, it is not determined that the cursor movement operation is performed (step S101: NO), next, the processor 20 executes the process of step 109.

In step S102, the processor 20 updates the position of the cursor object 38 based on the operation data and stores the updated position as the cursor position data in the memory. Here, the processor 20 moves the cursor object 38 in section units on the terrain object 31. Specifically, based on the operation direction of the analog stick 42, the processor 20 updates the x-coordinate value and the z-coordinate value of the current cursor object 38. Based on the updated x-coordinate value and z-coordinate value of the cursor object 38, the processor 20 sets the y-coordinate value of the cursor object 38. Specifically, the processor 20 sets the y-coordinate value of a point on the terrain object 31 having the same x-coordinate value and z-coordinate value as the updated x-coordinate value and z-coordinate value of the cursor object 38 as the y-coordinate value of the cursor object 38. Consequently, the cursor object 38 moves in section units on the terrain object 31 in accordance with an operation on the analog stick 42. The cursor object 38 may be placed at a position at a predetermined height from the terrain object 31. In this case, a value obtained by adding a predetermined value to the y-coordinate value of the terrain object 31 may be set as the y-coordinate value of the cursor object 38. Next, the processor 20 executes the process of step 103.

In step S103, the processor 20 executes an object selection process. The object selection process is the process of selecting a virtual object in a case where a predetermined selection operation is performed using the left or right controller. Specifically, in a case where a virtual object is present at the position of the cursor object 38, and if a selection operation is performed using the left or right controller, the processor 20 selects the virtual object. Next, the processor 20 executes the process of step 104.

In step S104, the processor 20 determines whether or not the virtual object is being selected using the cursor object 38. If the virtual object is not being selected (step S104: NO), next, the processor 20 executes the process of step 105. If, on the other hand, the virtual object is being selected (step S104: YES), next, the processor 20 executes the process of step 107.

In step S105, the processor 20 changes the pitch of the first cursor sound in accordance with the height of a ground surface. Specifically, in accordance with the height of the terrain object 31 indicated by the cursor object 38 (the y-coordinate value of the cursor object 38), the processor 20 changes the first cursor sound based on the first sound data. For example, if the cursor object 38 indicates the terrain object 31a, the processor 20 makes the pitch of the first cursor sound based on the first sound data lower than normal. For example, the processor 20 lowers the frequency or weakens a particular high-frequency component, thereby lowering the pitch of the first cursor sound. If the cursor object 38 indicates the terrain object 31b, the processor 20 does not change the first cursor sound based on the first sound data. If the cursor object 38 indicates the terrain object 31c, the processor 20 makes the pitch of the first cursor sound based on the first sound data higher than normal. For example, the processor 20 heightens the frequency or weakens a particular low-frequency component, thereby heightening the pitch of the first cursor sound. Next, the processor 20 executes the process of step 106.

In step S106, the processor 20 outputs the first cursor sound. If the first cursor sound is changed in step S105, the changed first cursor sound is output. Consequently, if the cursor object 38 indicates the terrain object 31a, the first cursor sound (low) is output. If the cursor object 38 indicates the terrain object 31b, the first cursor sound (medium) is output. If the cursor object 38 indicates the terrain object 31c, the first cursor sound (high) is output. The first cursor sound has a predetermined length (e.g., 0.5 seconds). If the first cursor sound is not being currently output, the processor 20 outputs the first cursor sound based on the first sound data. In this manner, first cursor sounds having different pitches are output in accordance with the height of the terrain object 31 indicated by cursor object 38. Next, the processor 20 executes the process of step 109.

On the other hand, in step S107, the processor 20 changes the pitch of the second cursor sound in accordance with the height of a ground surface. Although the process of step S107 is similar to the process of step S105, step S107 is different from step S105 in sound data used as a sound source. That is, in step S107, the second sound data is used. Next, the processor 20 executes the process of step 108.

In step S108, the processor 20 starts outputting the second cursor sound. If the second cursor sound is changed in step S107, the changed second cursor sound is output. The process of step S108 is similar to the process of step S106, and therefore is not described in detail. Next, the processor 20 executes the process of step 109.

In step S109, the processor 20 performs an object placement process. Here, in accordance with a placement operation on a virtual object using the left or right controller, the process of placing the virtual object on the terrain object 31 is performed. Specifically, the processor 20 determines whether or not a placement operation is performed. If the placement operation is performed, the processor 20 places a virtual object at a position on the terrain object 31 indicated by the cursor object 38. Consequently, a virtual object that is being selected is placed at the position indicated by the cursor object 38. Alternatively, a new virtual object may be placed at the position indicated by the cursor object 38. Next, the processor 20 executes the process of step 110.

In step S110, the processor 20 performs an image display process. Specifically, the processor 20 generates a game image based on the virtual camera placed in the virtual space and outputs the generated game image to the display 12. Next, the processor 20 executes the process of step 111.

In step S111, the processor 20 determines whether or not the game processing is to be ended. If the determination is NO in step S111, the processor 20 executes the process of step S100 again. If the determination is YES in step S111 (e.g., if the player gives an instruction to end the game), the processor 20 ends the game processing shown in FIG. 13.

As described above, in the exemplary embodiment, in accordance with the height of the cursor object 38 (the height of the terrain object 31 indicated by cursor object 38), the pitch of the cursor sound is changed, and the cursor sound is output. For example, the higher the position indicated by the cursor object 38 is, the higher the pitch of the cursor sound to be output is. Consequently, if the terrain object 31 indicated by the cursor object 38 changes, the cursor sound changes. Thus, the player can easily recognize that the terrain object 31 indicated by the cursor object 38 changes. Based on the cursor sound, it is also possible to cause the player to recognize which of a plurality of portions of the terrain object 31 different in height the cursor object 38 indicates.

(Variations)

While the game processing according to the exemplary embodiment has been described above, the exemplary embodiment is merely an example and can be modified as follows, for example.

For example, in the above exemplary embodiment, in accordance with the height of the cursor object 38 (the height of the terrain object 31 indicated by cursor object 38), the pitch of the cursor sound is changed. In another exemplary embodiment, the cursor sound may be changed by changing at least any one of the pitch, the loudness, and the timbre of the cursor sound in accordance with the height of the terrain object 31 indicated by cursor object 38. For example, the cursor sound may be changed using a predetermined frequency filter. For example, the cursor sound may be output by combining a plurality of sounds. Sounds to be combined may be varied in accordance with the height of the terrain object 31 indicated by cursor object 38.

In the above exemplary embodiment, in a case where a virtual object is not being selected using the cursor object 38, the cursor sound is changed by changing a single piece of sound data in accordance with the height of the cursor object 38. That is, the cursor sound is changed by the processor 20 performing processing based on a program on sound data stored in advance. In another exemplary embodiment, a plurality of different pieces of sound data may be stored in advance, any sound data may be selected from among the plurality of pieces of sound data in accordance with the height of the cursor object 38, and the cursor sound based on the selected sound data may be output.

In the above exemplary embodiment, using different pieces of sound data between a case where a virtual object is not being selected and a case where a virtual object is being selected, the cursor sound when the cursor object 38 moves is output. In another exemplary embodiment, processing on a single piece of sound data may be performed, thereby outputting different cursor sounds between a case where a virtual object is not being selected and a case where a virtual object is being selected. That is, the processor 20 may perform processing based on a program on sound data stored in advance, thereby varying a cursor sound to be output in a case where a virtual object is not being selected and a cursor sound to be output in a case where a virtual object is being selected.

In the above exemplary embodiment, the terrain object 31 is an object representing a ground surface. Alternatively, a terrain object may be an object representing, for example, a water surface, a floor in a building, stairs, or the like.

In the above exemplary embodiment, a single terrain object is a flat surface, and a terrain object having a difference in height as a whole is formed of a plurality of terrain objects. Any terrain object may be used so long as a terrain object has a difference in height as a whole. For example, a terrain object may be formed of a curved surface, or may be formed of an uneven surface. A terrain object may have a flat surface having a plurality of points different in height (e.g., a slope). Then, based on the premise that a position on a terrain object having a difference in height is indicated using a cursor object, when the cursor object moves, different cursor sounds may be output in accordance with the height of the position indicated by the cursor object.

In the above exemplary embodiment, a planar object is used as the cursor object 38. Alternatively, an object of any shape may be used as a cursor object. For example, a cursor object may be a three-dimensional object. A cursor object may be a character capable of moving on a terrain object (the player character 30 or a character different from the player character 30). For example, a character as a cursor object may be displayed, a position on a terrain object may be indicated using the character, and a virtual object may be placed at the position indicated by the character. In this case, when the character moves on the terrain object, the cursor sound may be output in accordance with the height of the position of the character.

In the above exemplary embodiment, the cursor object 38 is moved in section units (discretely) on the terrain object 31 based on an operation input. In another exemplary embodiment, the cursor object 38 may be moved to any position (continuously) on the terrain object 31 based on an operation input.

In the above exemplary embodiment, the cursor object 38 moves the terrain object 31 (or moves along the terrain object 31) in accordance with an operation input provided to the analog stick 42. In another exemplary embodiment, the cursor object 38 may be moved based on another operation input. For example, the cursor object 38 may be moved based on a touch position detected by the touch panel. In this case, when the cursor object 38 indicates a first position on the terrain object 31, and if a second position on the terrain object 31 is touched, the cursor object 38 moves to the second position. At this time, the cursor sound may be output in accordance with the height of the second position.

A cursor object may not necessarily need to be displayed. For example, a cursor object internally indicating an indicated position on a terrain object in the main body apparatus 2 may be defined. Also in this case, when the cursor object moves (the internally indicated position changes), the cursor sound may be output in accordance with the height of the terrain object indicated by the cursor object.

In the above exemplary embodiment, the terrain object does not change during the execution of the game processing. That is, in the above exemplary embodiment, the terrain object is formed based on the terrain data stored in advance, and the terrain data is not changed in accordance with an operation input provided by the player during the execution of the game processing. In another exemplary embodiment, the terrain data may be changed in accordance with an operation input provided by the player while the above game processing is being performed. For example, a hole may be formed at a desired position on the terrain object, or earth may be piled up at a desired position on the terrain object in accordance with an operation input provided by the player, thereby changing the height of a part or the entirety of the terrain object. For example, a planar terrain object may be initially placed, and another terrain object may be placed on the planar terrain object based on an operation input provided by the player, thereby forming a terrain object having a difference in height as a whole. Even in a case where the height of the terrain object changes based on an operation input provided by the player, as described above, in accordance with the height of the terrain object indicated by the cursor object 38, the cursor sound may change when the cursor object 38 moves.

The processes shown in the above flow chart are merely illustrative, and the order and the contents of the processes, and the like may be appropriately changed. For example, the processes of steps S104 to S108 may be performed before step S102. In this case, if a cursor movement operation is performed, the cursor sound is output first in accordance with the height of the terrain object 31 indicated by the cursor object 38. Then, the cursor object 38 is moved.

The above game is merely an example, and the above processing may be performed in any other game.

In the above exemplary embodiment, the above processing is performed by the main body apparatus 2 in the game system 1. Alternatively, the above processing may be executed by any other information processing apparatus (e.g., a personal computer, a smartphone, or a tablet terminal) or the like. A part or all of the above processing may be executed by any of a plurality of apparatuses connected together via a network (e.g., a LAN, a WAN, or the Internet). For example, in an information processing system including a terminal and a server, some of the processes shown in the above flow chart may be executed by a processor of the server, or may be executed by a processor of the terminal.

While the exemplary embodiment has been described, the above description is merely illustrative, and the exemplary embodiment may be improved and modified in various manners.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium storing a game program configured to cause a computer of an information processing apparatus to perform operations comprising:

processing an operation input that is provided by a user;

outputting, to a display screen, a cursor object;

based on the processing of the operation input, moving the cursor object to indicate different positions on a terrain object that is located in a three-dimensional virtual space; and causing different sounds to be output from a speaker, wherein the sounds that are output are based on a height of the terrain object that is indicated by the cursor object.

2. The non-transitory computer-readable storage medium having stored therein the game program according to claim 1, wherein the different sounds include one of a pitch, a loudness, and a timbre of a sound in accordance with the height of the terrain object.

3. The non-transitory computer-readable storage medium having stored therein the game program according to claim 1, wherein the operations further comprise:

based on the operation input, placing a virtual object at a position on the terrain object indicated by the cursor object.

4. The non-transitory computer-readable storage medium having stored therein the game program according to claim 1, wherein the operations further comprise:

selecting a virtual object present on the terrain object indicated by the cursor object.

5. The non-transitory computer-readable storage medium having stored therein the game program according to claim 1, wherein the operations further comprise:

based on the operation input, moving the cursor object together with a virtual object that is being selected using the cursor object.

6. The non-transitory computer-readable storage medium having stored therein the game program according to claim 5, wherein the operations further comprise:

based on the virtual object not being selected using the cursor object, outputting different first cursor sounds in accordance with the height of the terrain object when moving the cursor object; and based on the virtual object being selected using the cursor object, outputting different second cursor sounds in accordance with the height of the terrain object when moving the cursor object and the virtual object.

7. The non-transitory computer-readable storage medium having stored therein the game program according to claim 1, wherein the operations further comprise:

changing the height of the terrain object based on the operation input.

8. The non-transitory computer-readable storage medium having stored therein the game program according to claim 1, wherein the cursor object is moved in section units on the terrain object or along the terrain object based on the operation input.

9. An information processing apparatus comprising:

a processor that is configured to:

process an operation input that is provided by a user;

output, to a display screen, a cursor object;

based on the processing of the operation input move the cursor object to indicate different positions on a terrain object that is located in a three-dimensional virtual space; and causing different sounds to be output from a speaker, wherein the sounds that are output are based on a height of the terrain object that is indicated by the cursor object.

10. The information processing apparatus according to claim 9, wherein the processor is further configured to output the cursor sounds different in at least any one of a pitch, a loudness, and a timbre of a sound in accordance with the height of the terrain object.

11. The information processing apparatus according to claim 9, wherein the processor is further configured to, based on the operation input, place a virtual object at a position on the terrain object indicated by the cursor object.

12. The information processing apparatus according to claim 9, wherein the processor is further configured to select a virtual object present on the terrain object indicated by the cursor object.

13. The information processing apparatus according to claim 9, wherein the processor is further configured to, based on the operation input, move the cursor object together with a virtual object that is being selected using the cursor object.

14. The information processing apparatus according to claim 13, wherein the processor is further configure to:

based on the virtual object not being selected using the cursor object, output different first cursor sounds in accordance with the height of the terrain object when moving the cursor object; and based on the virtual object being selected using the cursor object, output different second cursor sounds in accordance with the height of the terrain object when moving the cursor object and the virtual object.

15. The information processing apparatus according to claim 9, wherein the processor is further configured to change the height of the terrain object based on the operation input.

16. The information processing apparatus according to claim 9, wherein the cursor object is moved in section units on the terrain object or along the terrain object based on the operation input.

17. An information processing system comprising:

a display screen;

an operation device;

a speaker; and non-transitory memory that is coupled to at least one hardware processor that is configured to perform operations comprising:

processing an operation input that is provided by a user using the operation device;

outputting, to the display screen, a cursor object;

based on the processing of the operation input, moving the cursor object to indicate different positions on a terrain object that is located in in a three-dimensional virtual space; and outputting, via the speaker, different sounds, wherein the sounds that are output are controlled based on a height of the terrain object indicated by the cursor object.

18. The information processing system according to claim 17, wherein at least any one of a pitch, a loudness, and a timbre of the sound is controlled based on the height of the terrain object.

19. The information processing system according to claim 17, wherein the operations further comprise:

placing, based on the operation input, a virtual object at a position on the terrain object indicated by the cursor object.

20. The information processing system according to claim 17, wherein the operations further comprise:

selecting a virtual object present on the terrain object indicated by the cursor object.

21. The information processing system according to claim 17, wherein the operations further comprise:

moving, based on the operation input, the cursor object together with a virtual object that is being selected using the cursor object.

22. The information processing system according to claim 21, wherein the operations further comprise:

based on the virtual object not being selected using the cursor object, outputting different first cursor sounds in accordance with the height of the terrain object when moving the cursor object; and based on the virtual object being selected using the cursor object, outputting different second cursor sounds in accordance with the height of the terrain object when moving the cursor object and the virtual object.

23. The information processing system according to claim 17, wherein the operations further comprise: changing the height of the terrain object based on the operation input.

24. The information processing system according to claim 17, wherein the cursor object is moved in section units on the terrain object or along the terrain object based on the operation input.

25. An information processing method executed by a computer, the method comprising:

processing an operation input that is provided by a user;

outputting, to a display screen, a cursor object;

based on the processing of the operation input, moving the cursor object to indicate different positions on a terrain object that is located in a three-dimensional virtual space; and outputting, via a speaker, different sounds, wherein the sounds that are output are based on a height of the terrain object that is indicated by the cursor object.

\* \* \* \* \*